Dec. 13, 1938.      O. F. BRAUER      2,139,667
LOADING APPARATUS
Filed Feb. 6, 1936
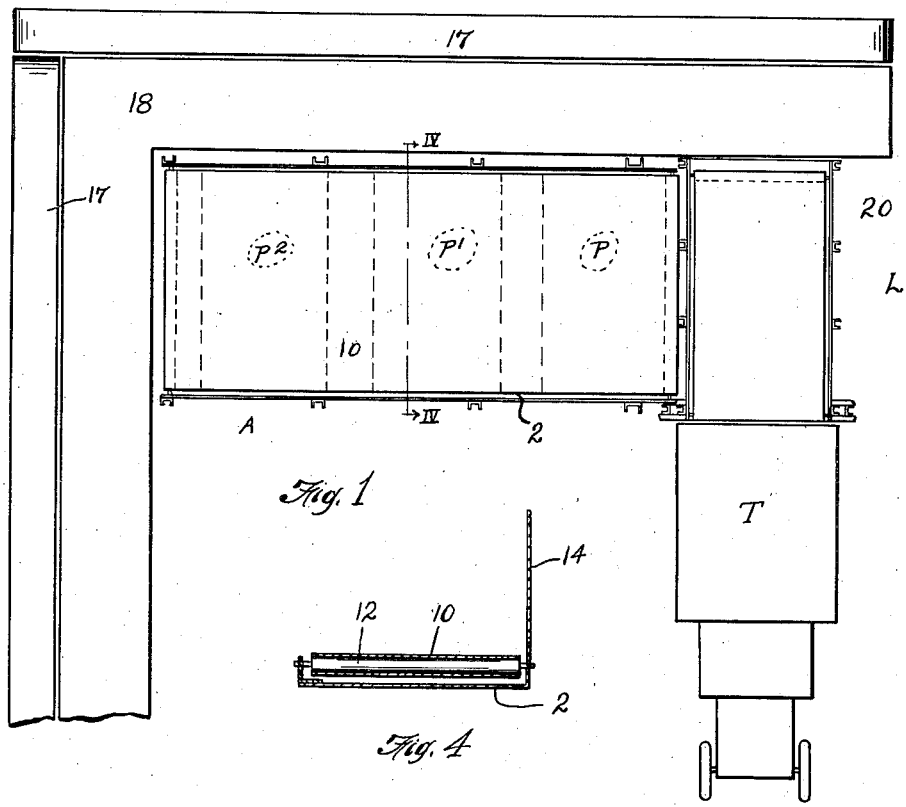
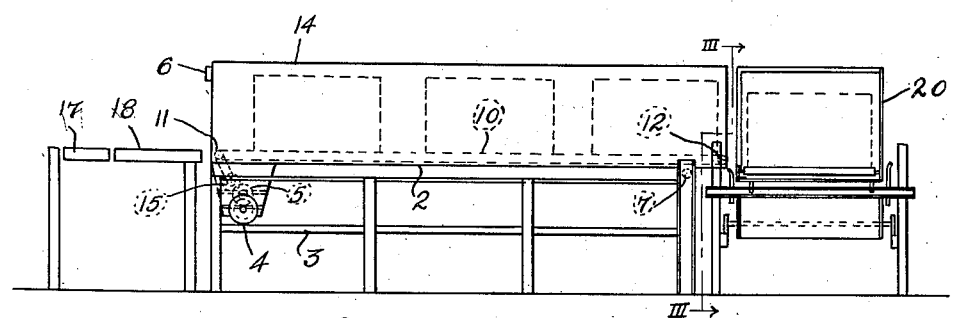
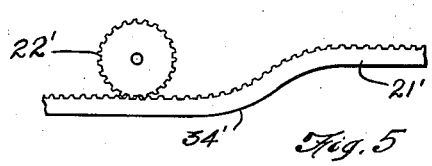
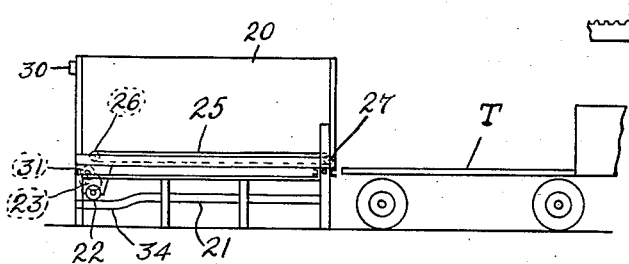
INVENTOR.
Oscar F. Brauer
BY
Paff, Oberlin & Paff
ATTORNEYS.

Patented Dec. 13, 1938

2,139,667

UNITED STATES PATENT OFFICE 2,139,667

LOADING APPARATUS

Oscar F. Brauer, Lakewood, Ohio, assignor to The Cleveland Shopping News Company, Cleveland, Ohio, a corporation of Ohio Application February 6, 1936, Serial No. 62,664

10 Claims. (Cl. 214—38)

This invention relates to loading apparatus; and it is among the objects of the invention to provide mechanism for pre-forming loads and stowing same into a truck or car, with a minimum delay. Another object is the provision of means for assuring accuracy of loading and placement. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—

Fig. 1 is a plan view of apparatus embodying the invention; Fig. 2 is a side elevational view thereof; Fig. 3 is a sectional view taken on a plane substantially indicated by line III, Fig. 2; Fig. 4 is a sectional view taken on a plane substantially indicated by line IV, Fig. 1; and Fig. 5 is an enlarged modified detail.

Referring more particularly to the drawing, there is shown a load assembler A, and a loader L in relation with a vehicle or automobile truck T to be loaded. The truck, being backed into position at the loader L, the load which is in readiness thereon, is quickly deposited onto the floor of the truck, which is then ready to get out of the way, and a new truck take its place. The load-assembler A pre-forms the loads and quickly deposits each load in turn on the loader L, this thereby being supplied as rapidly as it can load the trucks successively brought to it. The load-assembler A comprises in general a sort of movable platform so mounted with respect to the loader L as to be capable of being projected thereinto, and on being withdrawn therefrom, leave a pre-formed load evenly deposited on the loader, whereby the latter may then in turn quickly charge the truck or other vehicle. In the particular form illustrated, the load-assembler involves a reciprocable movable carriage 2, mounted on suitable supporting means, as for instance tracks 3, Fig. 2, on which the track wheels 4 of the carriage travel, the track wheels being suitably driven, as for instance by a motor 5 which is controlled by a suitable circuit-controller 6 at a convenient location, for instance the rear of the load-assembler. Forwardly, in the supporting frame for the load-assembler carriage, support-rollers 7 are suitably provided, whereby the carriage may be in part supported as the track wheels 4 carry it back and forth in operation. The bottom of the floor of the carriage is movable, and arranged to be moved reversely as the carriage is withdrawn from the loader L, so that the stack or pre-formed load is left on the loader by being deposited thereon as the load assembly carriage is withdrawn from the loader. The precise means for accomplishing this may vary somewhat, and in the form illustrated the floor of the load-assembler is movable preferably with a positive drive operable simultaneously with the movement of withdrawal of the carriage as a whole. While the floor may be of rollers throughout, it is preferred to have an endless belt 10, this being driven for instance by roller 11, and end-roller 12 and such intermediate support rollers as are desired may additionally support the belt. The belt bottom 10 is desirably of a width equal to the length of the loader L, and the front side of the load-assembler is desirably provided with a wall 14, and thus it is easy for operators on the platform 18 to stack and form a load on the load-assembler in contour and weight appropriate to the final form as received in the truck. The operators may of course load from the open side or the open end or both, of the load-assembler, and with a sufficiently long carriage, there is space for the pre-forming of a series of loads P, P', P2, etc. With an independent drive motor 15 for the belt-bottom, the latter may be stepped up progressively as required for the provision of the successive load stacks, and thus for instance one load stack is always ready to go immediately onto the loader L and space is available at the opposite end of the load-assembler whereon the operators may work. By the provision of a feed conveyor or conveyors in convenient reach, for instance conveyors 17, coming from the source of supply of the bundles, packages, etc., to be loaded, the work of the operators is correspondingly facilitated.

The loader L is in effect also a reciprocable carriage, and while its form may vary, in the construction illustrated there is a movable body 20 mounted on suitable supporting means, as for instance tracks 21, Fig. 3, track wheels 22 driven by a suitable motor 23 constituting a convenient means for reciprocatively moving the loader body into and out of a truck or the like to be loaded. The bottom or floor of the loader is also movable in order to deposit the load onto the floor of the truck as withdrawn. While the removal of the load from the floor of the loader may be effected by various means, preferably the floor is formed with rollers, and desirably an endless belt 25 constitutes the effective portion of the surface, being adapted to be driven for instance by a motor 31 through roller 26, while the roller 27 and such intermediate rollers as are desired require no other drive.

The mode of operation of the apparatus will be readily understood from the foregoing. A truck T to be loaded, is backed into position at the loader L, and previously the load for the truck has been pre-formed by the operators on the platform stacking up the bundles, packages, etc., from the supply 17, to form the load of desired size and contour, a series in fact having been formed and the load-assembler bottom having been stepped up successively therefor; and then for the charging of the loader, the load-assembler is moved forwardly into the loader L by the operator manipulating electric controller 6 to actuate the drive motor 5 and move the entire carriage forwardly into the loader. Thereupon, the movement of drive motor 5 is reversed and simultaneously the belt motor 15 is set into operation to move reversely with the same surface speed that the carriage as a whole is withdrawn from the loader L, and the pre-formed load is thereby evenly and smoothly deposited on the floor of the loader. The carrying of the load into the truck T is finally effected by the operator putting the loader drive motor 23 into operation from the controller 30, the track wheels 22 carrying the loader body forwardly into the truck. Thereupon, the operator reverses the drive motor 23, and at the same time puts into operation the belt motor 31, and the belt bottom moves reversely as the loader is backed out of the truck, and smoothly deposits the load on the truck floor. Since generally, it is desirable or necessary that the loader L should work at more or less of a slant, the rear end being higher as it comes into the final position in the truck-loading operation, this introduces a discrepancy with respect to leveling up with the load-assembler 2 when the loader L is back in its position thereagainst. To meet this situation, the track-rails 21 for the loader may be arranged with their rear portion at a lower level, as compared with the forward portion; thus, for instance, the rails may have a depressed rear portion 34, Fig. 3, and when the track wheels ride thereon, the loader body is leveled back to the plane of the load-assembler 2 for proper cooperation therewith, but forward movement of the loader L into the truck T allows of the sloping position desired there.

Where the apparatus is used in a position more or less exposed such that rails 34 might at times get slippery from rain etc., it is desirable that the rails be of a character as illustrated in Fig. 5, in which the rails 21 are toothed such that the toothed wheels 22' can accurately ride the slight incline at 34'.

Other modes of applying the principle of the invention may be employed, change being made as regards the details described, provided the features stated in any of the following claims, or the equivalent of such, be employed.

I therefore particularly point out and distinctly claim as my invention:—

1. Loading apparatus, comprising a load-assembler, including a reciprocatively movable carriage, an endless belt bottom therefor, a trackway supporting said carriage, means for reciprocatively moving said carriage, and means for moving said belt bottom as the carriage is retracted; and a loader to receive said load-assembler when projected, said loader including a body with an open side next the load-assembler, an endless belt bottom in said loader-body, means for reciprocatively moving said loader-body into and out of a vehicle to be loaded, means for moving the belt bottom as the loader is withdrawn from the vehicle, and a trackway supporting said loader and having its inner portion depressed to a lower level than its outer portion.

2. Loading apparatus, comprising a load-assembler, including a reciprocatively movable carriage, an endless belt bottom therefor, a trackway supporting said carriage, means for reciprocatively moving said carriage, and means for moving said endless belt bottom as the carriage is retracted; and a loader to receive said load-assembler when projected, said loader including a body with an open side next to the load-assembler, means for reciprocatively moving said loader-body into and out of a vehicle to be loaded, means for depositing the load on the floor of the vehicle as the loader is withdrawn, and a trackway supporting said loader and having its inner portion depressed to a lower level than its outer portion.

3. Loading apparatus, comprising a load-assembler, including a reciprocatively movable carriage, a trackway supporting said carriage, means for reciprocatively moving said carriage, and means for moving the bottom of said carriage as the carriage is retracted; and a loader to receive said load-assembler when projected, said loader including a body with an open side next to the load-assembler, means for reciprocatively moving said loader-body into and out of a vehicle to be loaded, means for moving the belt bottom as the loader is withdrawn from the vehicle, and a trackway supporting said loader.

4. Loading apparatus, comprising a load-assembler, including a reciprocatively movable carriage, a trackway supporting said carriage, means for reciprocatively moving said carriage, and means for moving the bottom of said carriage as the carriage is retracted; and a loader including a body with an open side next to the load-assembler to receive said load-assembler when projected, said loader having means for reciprocatively moving same into and out of a vehicle to be loaded, and means for supporting said loader.

5. Loading apparatus, comprising a reciprocatively movable load-assembler, a loader into which said load-assembler is adapted to move for deposit of a load, a trackway for said loader, means for compensating the slant of said loader to the load-assembler, said means including a toothed inclined portion for said trackway; an endless belt bottom in said loader, and means for moving said belt bottom.

6. Loading apparatus, comprising a reciprocatively movable load-assembler; a loader including a body with an open side next to the load-assembler into which said load-assembler is adapted to move for deposit of a load, said loader having a reciprocatively movable carriage; and a trackway for said loader carriage having an inclined portion.

7. Loading apparatus, comprising a reciprocatively movable load-assembler; a loader into which said load-assembler is adapted to move for deposit of a load, including a reciprocatively movable carriage, a trackway for said carriage, and means in association with said trackway for compensating the loader slant to the load-assembler.

8. Loading apparatus, comprising a reciprocatively movable load-assembler, including a reciprocatively movable carriage, a trackway therefor, and a bottom in said carriage movable as the carriage is retracted; and a loader including a body with an open side next to the load-assembler into which said load-assembler is adapted to move for deposit of a load, said loader being movable into a vehicle and adapted to deposit its load as the loader is withdrawn from the vehicle.

9. Loading apparatus, comprising means for providing a plurality of pre-formed loads, said means including a reciprocatively movable load-assembler having a discharging floor; and a loader including a body with an open side next to the load-assembler into which said load-assembler is adapted to move for deposit one at a time of the pre-formed loads, said loader being movable into a vehicle and having a bottom movable as the loader is withdrawn from the vehicle.

10. Loading apparatus, providing means for a plurality of pre-formed loads, said means including a load-assembler movable forwardly and rearwardly, and movable bottom in said load-assembler, means for moving said bottom as the load-assembler is moved rearwardly, and a loader including a body with an open side next to the load-assembler to receive one at a time of the pre-formed loads therefrom, and means for moving said loader into a vehicle for deposit of such load.

OSCAR F. BRAUER.